(12) United States Patent
Miloslavsky

(10) Patent No.: US 8,544,399 B2
(45) Date of Patent: Oct. 1, 2013

(54) ORNAMENTED COMPOSITE MATERIALS

(76) Inventor: Gennady Miloslavsky, Brooklyn, NY (US)

(*) Notice: Subject to any disclaimer, the term of this patent is extended or adjusted under 35 U.S.C. 154(b) by 526 days.

(21) Appl. No.: 12/784,476

(22) Filed: May 20, 2010

(65) Prior Publication Data

US 2011/0287212 A1    Nov. 24, 2011

(51) Int. Cl.
*D05B 3/00* (2006.01)
*B32B 3/06* (2006.01)

(52) U.S. Cl.
USPC ........................... 112/475.18; 428/104

(58) Field of Classification Search
USPC .............. 112/475.01–475.23; 428/104
See application file for complete search history.

(56) References Cited

U.S. PATENT DOCUMENTS

| | | | | |
|---|---|---|---|---|
| 6,392,206 | B1 * | 5/2002 | Von Arx et al. | 219/468.1 |
| 7,461,444 | B2 * | 12/2008 | Deaett et al. | 29/600 |
| 7,546,698 | B2 * | 6/2009 | Meschter | 36/45 |
| 7,740,935 | B2 * | 6/2010 | Srisothornwongse | 428/343 |
| 7,895,717 | B2 * | 3/2011 | Tuma | 24/442 |
| 2008/0193709 | A1 * | 8/2008 | Han | 428/100 |
| 2011/0260494 | A1 * | 10/2011 | Kudrashova | 296/107.09 |

* cited by examiner

*Primary Examiner* — Ismael Izaguirre
(74) *Attorney, Agent, or Firm* — Antonio Papageorgiou Ostrow Kaufman LLP

(57) ABSTRACT

A method for producing a composite part is provided that includes the steps of obtaining a fibrous mat having an outer surface; stitching an ornamental feature over the outer surface of the fibrous mat; and encapsulating the fibrous mat with the ornamental feature stitched therein in a transparent matrix with the ornamental feature outwardly visible through the matrix.

14 Claims, 5 Drawing Sheets

ORNAMENTED COMPOSITE MATERIALS

BACKGROUND OF THE INVENTION

The present application relates to composite materials, such as carbon fiber, graphite fiber, and fiber glass materials.

Many composite materials have a unique pattern in the finished product. Carbon fiber, for example, exhibits a checkered pattern in final form. Although visually appealing, vast expanses of the characteristic checkered pattern tend to be unexciting. The composite may be painted, however, this adds to the complexity and therefore the cost of the final product. Accordingly, there is a need for methods and systems for producing ornamented composite materials that are easy to produce and thereby less costly.

SUMMARY OF THE INVENTION

A method for producing a composite part is provided that includes the steps of obtaining a fibrous mat having an outer surface; stitching an ornamental feature over the outer surface of the fibrous mat; and encapsulating the fibrous mat with the ornamental feature stitched therein in a transparent matrix with the ornamental feature outwardly visible through the matrix.

In one embodiment, the fibrous mat is made of one of glass, carbon, boron, graphite, or Kevlar.

In one embodiment, the fibrous mat is a woven sheet of continuous fibers.

In one embodiment, the method further includes obtaining at least one other fibrous mat, disposing the at least one other fibrous mat under the fibrous mat with the ornamental feature disposed thereon, and encapsulating the at least one other fibrous mat in the transparent matrix. The ornamental feature is thereby disposed in an outer most layer of the composite material.

In one embodiment, the ornamental feature comprises one of a logo or lettering embroidered into the fibrous mat.

In one embodiment, the ornamental feature comprises an appliqué stitched over the fibrous mat.

In one embodiment, the fibrous mat is made of a first material and the appliqué is made of a second material visibly different than the first.

In one embodiment, the appliqué is a non-structural component of the composite part.

In one embodiment, the ornamental feature is stitched into the fibrous mat with a thread having a color that is dissimilar from a color of the fibrous mat.

In one embodiment, the ornamental feature is stitched into the fibrous mat with a sewing machine.

In one embodiment, the ornamental feature is stitched into the fibrous mat with a thread held in tension to provide a color in the thread that is dissimilar from a color of the fibrous mat.

In one embodiment, the method further includes obtaining at least one other fibrous mat and stitching the at least one other fibrous mat side by side to the fibrous mat with the ornamental feature disposed thereon, and encapsulating the at least one other fibrous mat in the transparent matrix with the fibrous mat with the ornamental feature disposed thereon with a seam visibly appearing therewith in the composite part.

In one embodiment, the composite part is an automotive part.

In one embodiment, the composite part is an item of jewelry. In one embodiment, the ornamental feature in the jewelry comprises one of a logo or lettering embroidered into the fibrous mat.

Additional aspects of the present invention will be apparent in view of the description which follows.

DETAILED DESCRIPTION OF THE INVENTION

The present application provides generally novel methods and systems for producing ornamented composite materials. Composite materials in accordance with at least one embodiment of the materials disclosed herein are generally one or more mats or sheets of fibers, such as glass, carbon, boron, graphite, Kevlar, etc. or any other material in a matrix or binder. The mat or sheet may be a woven mat of continuous fibers or a mat of short fiber strands. Any matrix may be used to bind the fibers. Several broad categories of resins may be used, such as polyester, vinyl ester, epoxy, phenolic, polyimide, polyamide, polypropylene, PEEK, and others. Preferably, a transparent resin is used, which allows the ornamentation applied to the composite as discussed below to be visible.

Generally, the composite is formed by placing a plurality of layers of mat over each other until a desired thickness is achieved. The resin may be introduced in a variety of ways. For example, the resin may be applied by wetting each layer of mat as the layers are built up to the desired thickness. Alternatively, the mat may be pre-impregnated with the desired resin. The shape of the final product may be achieved with any molding technique, such as vacuum bag molding, pressure bag molding, autoclave molding, resin transfer molding, etc.

Figure 1:
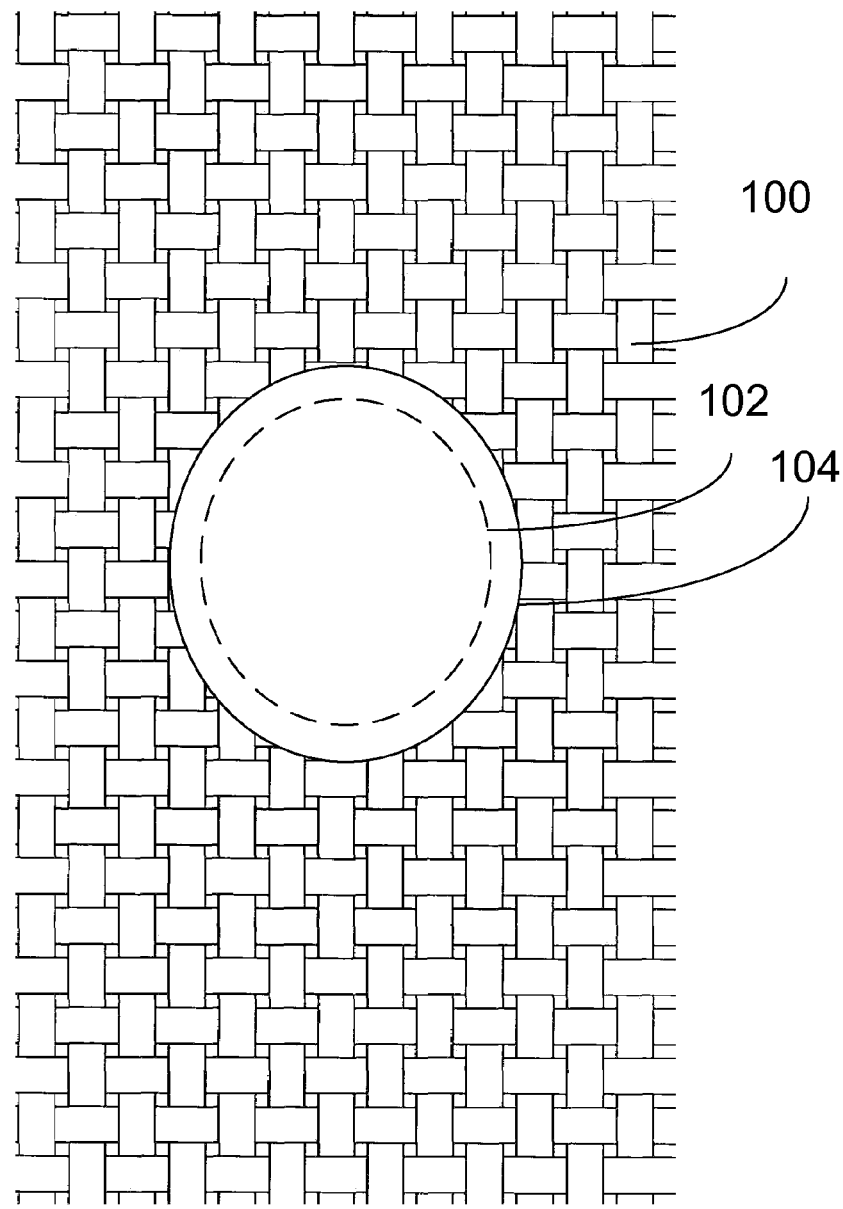
FIG. 1 is a plan view of a composite material according to one embodiment of the materials discussed herein.

Referring to FIG. 1, in at least one embodiment, the composite material includes a plurality of layers of a fibrous mat. At least one of the layers, i.e., an upper or outer most layer 100 includes an ornamental feature 102 disposed thereon. Importantly, the ornamental feature 102 is disposed on the outer most layer 100 prior to the addition of any resin to the outer most layer 100. The resin is preferably applied subsequent to one affixing the ornamental feature 102 to the outer most layer 100. This way, the ornamental feature 102 becomes visibly encapsulated within the composite material.

The ornamental feature 102 may be any predefined design. For example, the may be a geometric shape, such as a circle, square, pentagon, hexagon, etc. The ornamental feature 102 may be a nonstructural addition to the composite material. In this instance, the ornamental feature may be made from any material, such as paper, cotton, wool, nylon, etc., in the form of a sheet or otherwise. The ornamental feature 102 may also be structural. In this instance the ornamental feature may be a fibrous mat the same as the outer most layer 100 or different that the outer most layer 100. For example, the outer most layer 100 may be a carbon fiber mat whereas the ornamental feature 102 may be a Kevlar mat. The mats themselves may be oriented so that the weave is in the same direction or that is in a direction other than in the same direction. This allows designers to create a composite part with non-omnidirectional weaves.

The ornamental feature 102 is preferably affixed to the outer most layer 100 by stitching the ornamental feature 102 to the outer most layer 100 with a thread 102 or otherwise adhering the ornamental feature 102 to the outer most layer 100, e.g., as an overlay. The thread is generally passed through the layers of the ornamental feature 102 and at least the outer most layer 100. This may be accomplished by hand or preferably with a sewing machine. The thread itself may be non-structural or structural. In the non-structural use, the thread may be made of any material, including cotton, wool, nylon, etc. In structural uses, the thread may be a fiber thread similar to that of the mat, such as carbon fiber, graphite fiber, Kevlar, etc. The thread selected may also be a color that is different or that contrasts the color of the ornamental feature 102, the outer most layer 100, or both. For example, the outer mat may be carbon mat oriented in a first direction, the ornamental feature may be carbon mat in a desired shape oriented in a second direction, and the thread may be a red nylon. When encapsulated in the resin, the composite will appear to have an appliqué or overlay affixed to the part with red thread.

Figure 2:
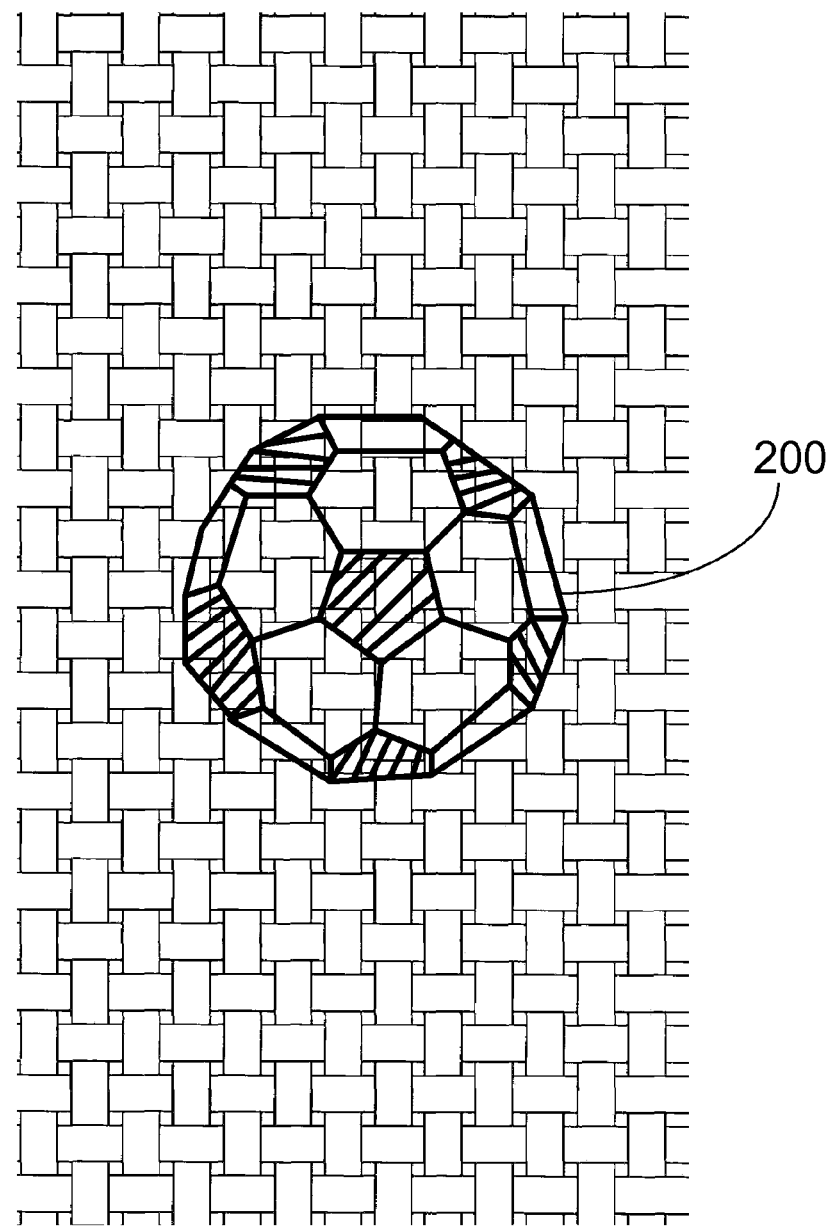
FIG. 2 is a plan view of a composite material according to another embodiment of the materials discussed herein.
Figure 3:
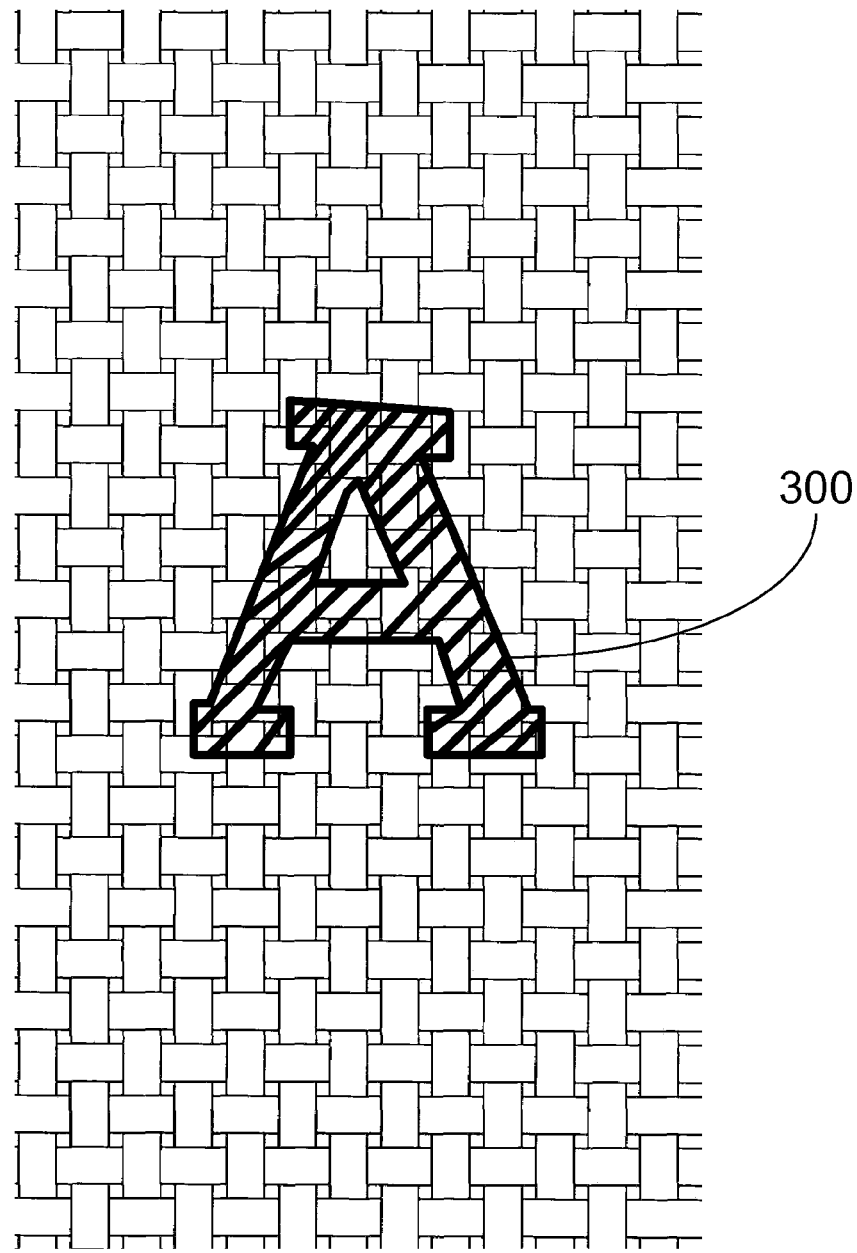
FIG. 3 is a plan view of a composite material according to another embodiment of the materials discussed herein.

Referring to FIG. 2, the ornamental feature 102 may be an icon 200 embroidered directly into the outer most layer 100. For example, the outer most layer 100 may be embroidered with an image of a soccer ball, as shown, or any other image. The embroidered ornamental feature may also be letters, as shown in FIG. 3, numbers, or a combination thereof. For example, the composite material may be personalized with a monogram or the name of an individual or the name of the company producing the part.

Figure 4:
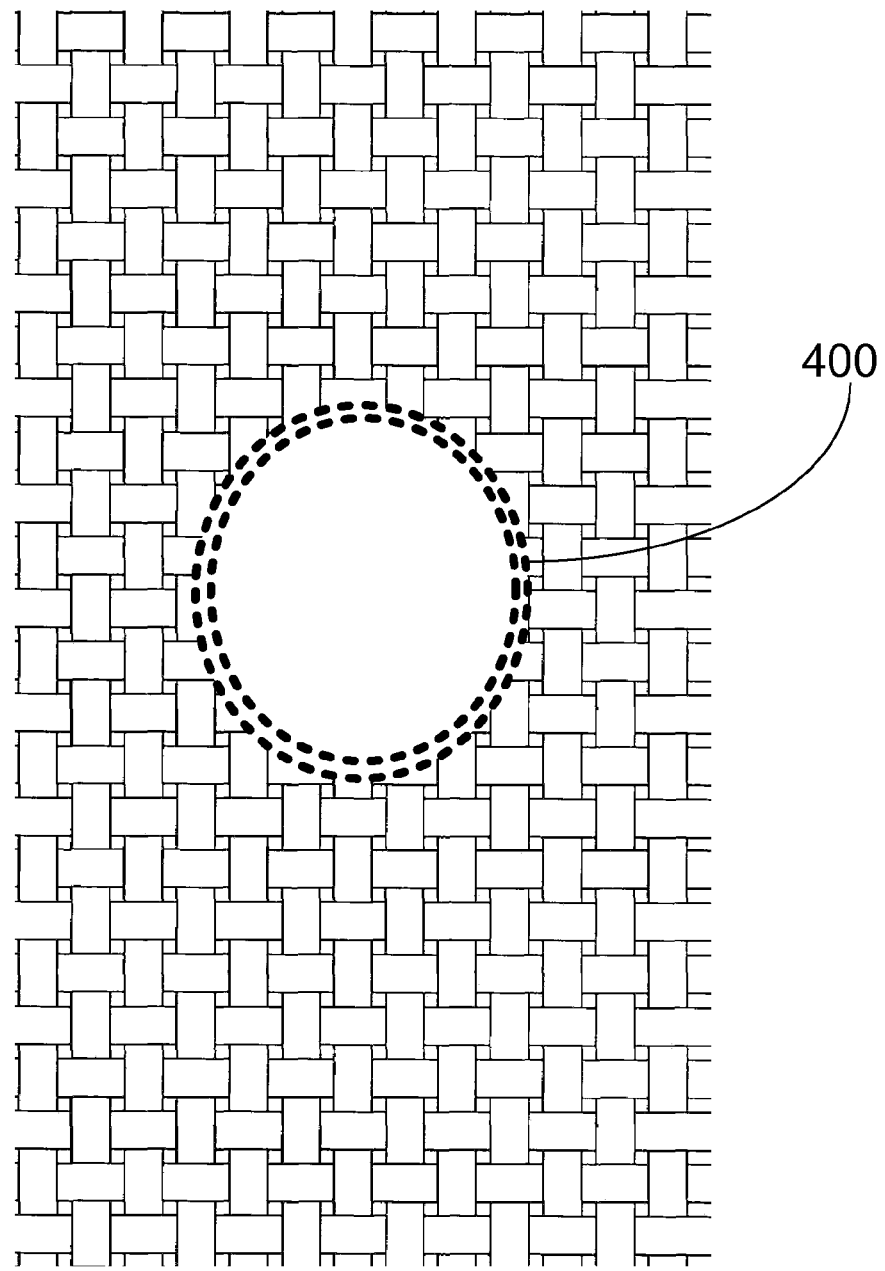
FIG. 4 is a plan view of a composite material according to another embodiment of the materials discussed herein.

Referring to FIG. 4, the threading may be used to structurally reinforce the composite materials, particularly around holes in the material. For example, the thread 400 may be a carbon thread that is sewn in a desired direction or pattern, preferably in a plurality of passes until the desired build up is achieved. For example, a thread may be stitched into one or more of the layers of the mat in a circular pattern around a hole in the part, as shown. As noted above, the thread may be the same or a different material than the outer most layer. For example, a carbon mat outer layer may be used with a Kevlar thread for its flexibility. The appearance of the thread in the composite material may be tailored by, e.g., maintaining the thread in a certain tension, prior to encapsulating the thread into the composite material.

In addition to overlays, a plurality of ornamental layers may be stitched together continuously, e.g., side by side, similar to that of a quilt. In this instance, the fabrics may be joined together in a particular pattern to form a three dimensional fabric similar to that of a tailored suit. This allows parts to be formed with a seam appearing therein. For example, a motorcycle gas tank may be formed from three or more fabric sections stitched together to form the general shape of the gas tank. The final part will appear as having been stitched together rather than the continuous appearance normally seen with composite parts.

Figure 5:
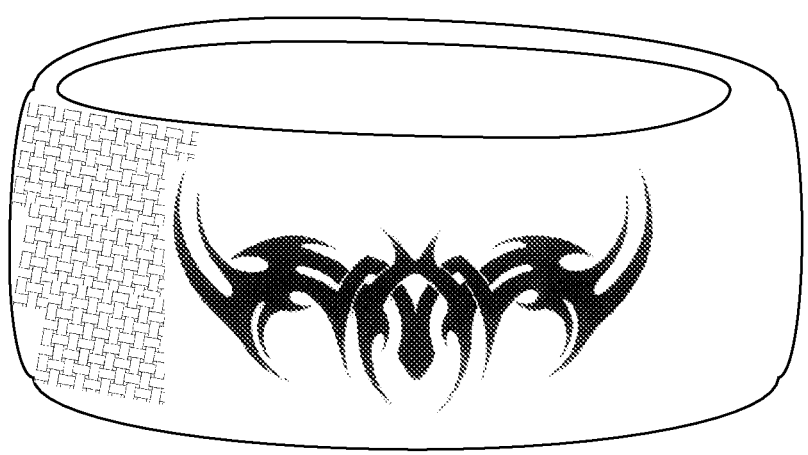
FIG. 5 is a side view of a composite material according to another embodiment of the materials discussed herein.

Unlimited types of parts may be produced using the composite material in accordance with at least one embodiment of the methods disclosed herein. For example, automotive parts, such as hoods, fenders, mirrors, spoilers, etc., may be produced with logos and/or wording visibly embedded into the composite material. Motorcycle parts, such as gas tanks, fenders, tins, helmets, etc., may be uniquely fashioned. Similarly, composite jewelry may be produced with greater visual appeal. For example, a carbon fiber bracelet may be produced with stitching and/or embroidery in a desired pattern or wording embedded into the composite material's top layer. For example, a tribal pattern may be embroidered into a carbon fiber bracelet as shown in FIG. 5. Composites may also be used to produce musical instruments or parts thereof. For example, a guitar sound board may be produced with carbon fiber and a contrasting thread stitched therein. Similarly, the inlays on the soundboard may be produced by attaching ornamental geometric shapes around the hole in the soundboard. The sound board may be structurally reinforced with an appliqué in desired areas, such as at the bridge plate. Coverings may be ornamented in accordance with this application, such as notebook computer and cell phone cases.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A method for producing a composite part comprising:
   obtaining a first fibrous mat having an outer surface;
   stitching an ornamental feature over the outer surface of the first fibrous mat;
   obtaining a second fibrous mat and stitching the second fibrous mat side by side to the first fibrous mat with a cotton or nylon thread therewith joining the first and second fibrous mats together into a continuous outer fibrous mat layer;
   obtaining a third fibrous mat;
   disposing the outer fibrous mat layer over the third the fibrous mat; and
   encapsulating the outer fibrous mat layer with the ornamental feature stitched therein and the third fibrous mat in a transparent matrix with the ornamental feature and a seam between the first and second fibrous mats outwardly visible in the composite part, wherein the first, second, and third fibrous mats are made of at least one of glass, carbon, and graphite.

2. The method of claim 1, wherein the fibrous mat is a woven sheet of continuous fibers.

3. The method of claim 1, wherein the ornamental feature comprises lettering embroidered into the fibrous mat.

4. The method of claim 1, wherein the ornamental feature comprises an appliqué stitched over the fibrous mat.

5. The method of claim 4, wherein the first fibrous mat is made of a first material and the appliqué is made of a second material visibly different than the first.

6. The method of claim 5, wherein the appliqué is a non-structural component of the composite part.

7. The method of claim 1, wherein the ornamental feature is stitched into the first fibrous mat with a thread having a color that is dissimilar from a color of the first fibrous mat.

8. The method of claim 1, wherein the ornamental feature is stitched into the first fibrous mat with a sewing machine.

9. The method of claim 1, wherein the ornamental feature is stitched into the first fibrous mat with a thread held in tension to provide a color in the thread that is dissimilar from a color of the fibrous mat.

10. The method of claim 1, wherein the first fibrous mat and the second fibrous mat are stitched side by side with a thread having a color dissimilar than the color of the first and second fibrous mats so that the composite part appears to be made of at least two fabric sections stitched together a seam visibly appearing therewith in the composite part.

11. The method of claim 10, wherein the composite part is an automotive part.

12. The method of claim 1, wherein the composite part is an item of jewelry.

13. The method of claim 12, wherein the ornamental feature comprises one of a logo or lettering embroidered into the fibrous mat.

14. The method of claim 1, wherein the first and second fibrous matts are stitched together to form a three dimensional fabric prior to encapsulation.

\* \* \* \* \*